United States Patent

[11] 3,627,818

[72] Inventor Edward S. Blake
    Kettering, Ohio
[21] Appl. No. 825,459
[22] Filed Jan. 31, 1969
[45] Patented Dec. 14, 1971
[73] Assignee Monsanto Research Corporation
    St. Louis, Mo.
    Original application Mar. 30, 1967, Ser. No. 626,955, now abandoned, Continuation-in-part of application Ser. No. 333,190, Dec. 24, 1963, now abandoned. Divided and this application Jan. 31, 1969, Ser. No. 825,459

[54] BRANCHED DIESTERS
    5 Claims, No Drawings
[52] U.S. Cl. .................................................. 260/476 R,
    252/56, 252/57, 260/475 R, 260/485 R
[51] Int. Cl. ........................................................ C07c 69/76
[50] Field of Search ............................................. 260/476, 476 R

[56] References Cited
    UNITED STATES PATENTS

| | | | |
|---|---|---|---|
| 3,114,766 | 12/1963 | Knopf et al. ................. | 260/476 R |
| 3,091,632 | 5/1963 | Hogemeyer et al. .......... | 260/476 R |
| 2,766,266 | 9/1956 | Emerson et al. .............. | 260/476 R |
| 2,743,187 | 4/1956 | Bell et al. ..................... | 260/476 R |

FOREIGN PATENTS

| | | | |
|---|---|---|---|
| 815,991 | 7/1959 | Great Britain ................ | 260/476 R |

*Primary Examiner*—Lorraine A. Weinberger
*Assistant Examiner*—Jacqueline L. Davison
*Attorneys*—Frank D. Shearin and L. Bruce Stevens, Jr.

ABSTRACT: As new compounds, diesters of mono- and dicarboxylic acids, having terminal dimethyl(phenyl)methyl groups and having no hydrogen atoms on the beta carbon atoms of the alcohol or diol. They are useful as functional fluids and have high oxidative stability.

BRANCHED DIESTERS

CROSS-REFERENCES TO RELATED APPLICATIONS

This is a division of application, Ser. No. 626,955, filed Mar. 30, 1967, which application is a continuation in part of my copending application, Ser. No. 333,190 filed Dec. 24, 1963 and now abandoned.

BACKGROUND OF THE INVENTION

This invention pertains to certain diesters of mono- and dicarboxylic acids which are useful as functional fluids, e.g., lubricants.

It is well established that aliphatic diesters are useful synthetic lubricants. In Synthetic Lubricants by R. C. Gunderson and A. W. Hart, Reinhold Publishing Corporation (N.Y.), 1962, reference is made to aliphatic diesters prepared from either branched chain alcohols and straight chain dicarboxylic acids, or from branched-chain acids and straight chain glycols.

In U.S. Pat. No. 2,889,354, Edward S. Blake and William C. Hammann disclose thermally stable functional fluids in the form of diesters prepared from aliphatic dicarboxylic acids and aliphatic primary alcohols having carbon substituents on the beta carbon atoms.

Apparently none of the prior art esters has had terminal dimethyl(phenyl)methyl groups such as disclosed in the present invention.

Many different types of materials are known to serve as functional fluids, and functional fluids are used in many different types of applications. Such fluids have been employed as synthetic lubricants, hydraulic fluids, heat-exchange media, atomic reactor coolants, diffusion pump fluids, damping fluids, bases for greases, etc. Owing to the wide variety of applications and the varied conditions under which functional fluids are utilized, the properties desired in a good functional fluid necessarily vary with the particular application in which it is to be used, with each individual application calling for a functional fluid having a specific class of properties. One important property of primary importance in a functional fluid is its viscosity characteristics over a wide temperature range. This is of great significance when the mechanism with which the fluid is employed is designed for use in widely differing environments. The fluid must often be one which remains liquid at temperatures which are well below freezing and also at temperatures which may be well above, say, 400° F. A particularly important requirement for lubricants intended for use in the newly designed jet aircraft engines is that the viscosity of the lubricants be as little affected as possible by the high temperatures to which they are necessarily subjected.

Another important property is high thermal stability in fluids used in hydraulic systems in modern vehicles wherein considerable heat buildup is incident to operation. For example, with increasing power, weight and speed of vehicles employing hydraulic brakes, there is a commensurate increase in temperature developed during normal operation of the brake system. Hence, in order to avoid vaporization of the fluid during use, the boiling point of the fluid must be below such developed temperature. Fluids having a boiling point of, say below 400° F., often demonstrate a tendency to vaporize during use in heavy, high-speed vehicles, whereby the normally liquid and noncompressible hydraulic brake fluid is converted into a compressible vapor and the hydraulic system is thus rendered inoperable. For use in hydraulic systems subjected to such temperatures, the fluid must be one which, as in the case of lubricants, possesses a high degree of thermal stability.

Still another property is oxidative stability, of importance in lubricants exposed to air, particularly at high temperatures. For example, in an internal combustion engine the lubricant for the cylinder walls becomes heated by contact with the hot cylinder walls and is continually circulated in an oxidizing atmosphere. A lubricant with poor oxidative stability becomes undesirably viscous and develops sludge which causes the pumping system to become inoperative.

SUMMARY OF THE INVENTION

This invention relates to diesters and more particularly provides a class of diesters having terminal dimethyl(phenyl)methyl groups and having no hydrogen atoms on the beta carbon atoms of the alcohol or diol, which diesters have high oxidative stability and are useful as functional fluids. The new compounds include the diesters of $\beta,\beta$-dimethylphenethyl alcohol and their reverse diesters, namely the diesters of dimethyl(phenyl)methyl substituted aliphatic acids, which have the structure

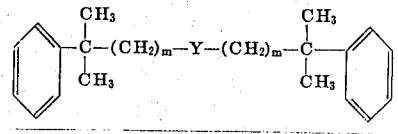

wherein $m$ is a number of from 0 to 2 and Y is selected from the class consisting of

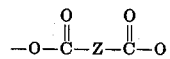

and

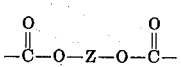

where Z represents

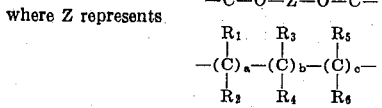

wherein $a$, $b$, and $c$ are numbers of from 0 to 3, $a+b+c$ is greater than 2, and where $R_1$, $R_2$, $R_3$, $R_4$, $R_5$ and $R_6$ taken separately are selected from the class consisting of hydrogen and a hydrocarbyl radical or, when taken together, $R_3$ and $R_4$ stand for a bivalent alkylene radical having from four to five carbon atoms in the chain and a total of from four to 10 carbon atoms.

Examples of the presently provided compounds are the diesters of $\beta,\beta$-dimethylphenethyl alcohol and an alkanedioic acid wherein the alkane chain consists only of unsubstituted methylene linkages, e.g., bis($\beta,\beta$-dimethylphenethyl) succinate, glutarate, adipate, pimelate, suberate, azelate, sebacate or dodecanedioate, or of an alkanedioic acid in which there are present one or more dimethyl-substituted methylene linkages, e.g., bis($\beta,\beta$-dimethylphenethyl 2,2-dimethylsuccinate, tetramethylsuccinate, 2,2- or 3,3-dimethylglutarate, 2,2,3,3-tetramethylglutarate, 2,2,3,3,4,4,-hexamethylglutarate, 2,2- or 3,3-dimethylhexane dioate, 2,2,6,6-tetramethylheptanedioate, 3,3- or 4,4-dimethylheptanedioate, etc.

Preparation of the present bis($\beta,\beta$-dimethylphenyethyl) alkanedioates is effected by simply contacting the $\beta,\beta$-dimethylphenethyl alcohol with the appropriate dialkanoic acid or acyl chloride or bromide or anhydride thereof at ordinary, decreased or increased temperatures and in the presence of an esterifying catalyst until formation of the alkanedioate has occurred.

Examples of useful reactants are succinic acid, succinic anhydride or succinoyl chloride or iodide; glutaric acid, its anhydride or glutaryl bromide; 3,3-dimethylglutaric acid, its anhydride or 3,3-dimethylglutaryl chloride or bromide; adipic acid or adipoyl chloride; pimelic acid or pimaloyl chloride or bromide, suberic acid or suberoyl chloride; azelaic acid or azelaoyl chloride or bromide, sebacic acid or sebacoyl chloride; dodecanedioic acid or dodecanedioyl chloride; 2,2-dimethylsuccinic acid, its anhydride or acyl chloride or bromide, etc.

Since the reaction involves condensation of two moles of the β,β-dimethylphenethyl alcohol with one mole of the alkanedioic acid compound, the two reactants are advantageously used in stoichiometric proportions, although to assure complete reaction of the acid component, an excess of the β,β-dimethylphenethyl alcohol may be used.

Further examples of the presently provided compounds are the reverse diesters, namely the diesters of dimethyl(phenyl)methyl substituted aliphatic acids and a diol having no hydrogen atoms on the beta carbon atom or atoms, e.g., with 2,2-dimethyl-1,3-propanediol, there is obtained 2,2-dimethyl-1,3-propanediol bis(2-methyl-2-phenylpropionate), 2,2-dimethyl-1,3-propanediol bis(3-methyl-3-phenylbutyrate), 2,2-dimethyl-1,3-propanediol bis(4-methyl-4-phenylvalerate), etc.; with 2,2-diethyl-1,3-propanediol, there is obtained 2,2-diethyl-1,3-propanediol bis(3-methyl-3-phenylbutyrate), etc.; with 2-butyl-2-ethyl-1,3-propanediol, there is obtained 2-butyl-2-ethyl-1,3-propanediol bis(3-methyl-3-phenylbutyrate), etc.; with 2,2,5,5-tetramethyl-1,6-hexanediol, there is obtained 2,2,5,5-tetramethyl-1,6-hexanediol bis(4-methyl-4phenylvalerate), etc.; with 1,1-cyclohexanedimethanol, there is obtained 1,1-cyclohexanedimethanol bis(3-methyl-3-phenylbutyrate), etc.; with 2-methyl-2-phenyl-1,3-propanediol there is obtained 2-methyl-2-phenyl-1,3-propanediol bis(3-methyl-3-phenyl valerate), etc.

Preparation of the present reverse diesters, namely the diesters of dimethyl(phenyl)methyl substituted aliphatic acids, is effected by simply contacting the dimethyl(phenyl)methyl substituted aliphatic acid or acyl chloride or bromide or anhydride thereof with an appropriate diol at ordinary, decreased or increased temperatures and in the presence of an esterifying catalyst until formation of the diester has occurred.

Examples of useful reactants are 2-methyl-2-phenylpropionic acid or anhydride or 2-methyl-2-phenylpropionyl chloride or bromide; 3-methyl-3-phenylbutyric acid or anhydride or 3-methyl-3-phenylbutyryl chloride or bromide; 4-methyl-4-phenylvaleric acid or anhydride or 4-methyl-4-phenylcaproyl chloride or bromide; and, as the diol, 2,2-dimethyl-1,3-propanediol, 2-butyl-2-ethyl-1,3-propanediol, 1,1-cyclohexanedimethanol, 2-methyl-2-phenyl-1,3-propanediol, etc.

Since the reaction for the formation of the reverse diesters involves condensation of two moles of the dimethyl(phenyl)methyl substituted aliphatic acid compound with one mole of the diol, the two reactants are advantageously used in stoichiometric proportions although to assure complete reaction of the diol component, an excess of the acid compound may be used.

In preparing either the diesters or reverse diesters, depending upon the nature of the acidic reactant, extraneous solvents or diluents may or may not be used. Examples of presently useful inert organic liquid diluents are the aliphatic or aromatic hydrocarbons such as hexane, toluene or xylene; ethers such as ethyl ether, dioxane or diglyme, halogenated compounds such as chloroform, carbon tetrachloride or chlorobenzene, etc. The temperature used will depend upon the nature of the individual reactants and catalyst and upon whether or not a diluent is used. Generally, when the acidic reactant is the acyl halide, reaction occurs exothermally, whereby external cooling may be advisable in order to obtain smooth reaction. Heating may be advantageous when employing the anhydrides or the free acids, and conveniently the reaction may then be conducted at the refluxing temperature of the reaction mixture.

Esterifying catalysts which may be used are organic or inorganic acidic or basic materials such as sulfuric acid, p-toluenesulfonic acid, hydrochloric acid, potassium hydroxide, sodium acetate, potassium methoxide, etc. When the dicarboxylic reactant is the acyl halide, provision for easy removal of byproduct hydrogen halide is usually desirable. This may be effected by conducting the reaction in the presence of an organic base which will serve as hydrogen halide scavenger, e.g., pyridine or trimethylamine. Removal of evolved hydrogen halide may also be facilitated by employing vigorous stirring and/or dephlegmation. When the acidic reactant is the free acid or the anhydride, water is evolved as byproduct. It may be collected during the reaction by means of a water trap if sufficiently high temperatures are employed for conducting the reaction. To provide for easy removal of reaction water, the condensation may also be advantageously conducted in the presence of a solvent which forms an azeotrope with water, e.g., toluene or xylene.

Completion of the esterification reaction can be generally ascertained by noting cessation in evolution of byproduct hydrogen halide or water, by noting change in viscosity, etc. Subsequent manipulation of the reaction mixture depends upon the nature and quantity of the initially employed materials and upon uses for which the diester product is destined. If reaction has been carried to completion and only stoichiometric amounts of reactants have been used, for some uses it will be necessary only to remove the diluent, e.g., by distillation, if a diluent had been employed. When a substantially pure product is desired, however, it is customary to treat the crude reaction product with aqueous acid or base in order to wash out the catalyst and to remove any solvent or unreacted material by distillation.

The present dimethyl(pheny)methyl substituted diesters are generally clear, well characterized, stable, high-boiling materials which are viscous liquids over wide temperature ranges, say, at from below 0° F. to 500° F., and usually do not decompose at temperature below, say, 550° F. When applied to metal surfaces they provide a fluid, protective film. Owing to their excellent properties, said diesters are eminently suited for use as oxidatively stable lubricants, as hydraulic fluids and as heat transfer agents and find application generally in fields where thermally stable, viscous liquids are needed.

The high-temperature oxidative stability of the present compounds makes them very useful as lubricants. Exposure of these diesters to air at, say, 450° F. does not cause serious sludging problems characteristic of less useful materials. Where these diesters have replaced conventional lubricating oils in high-temperature applications, cumbersome filtration and protective devices have been eliminated.

The low pour points of the present compounds together with their stability to heat makes them very useful as hydraulic fluids. The low pour points and desirable viscosity characteristics of said diesters permit their use in hydraulic pressure and automatic transmission devices which are designed for use in cold climates, and their very good vapor pressure characteristics and stability to heat allows use of the same devices in hot environments. The dimethyl(phenyl)methyl substituted diesters are particularly suited for use in hydraulic braking devices subjected to severe operating conditions wherein heat built up within the brake system is frequently encountered and it is mandatory that the hydraulic fluid remain liquid at the high temperatures thus developed. Such systems become inoperable if the fluid is vaporized, since it thus becomes compressible.

DESCRIPTION OF THE PREFERRED EMBODIMENTS

The invention is further illustrated by, but not limited to, the following examples.

EXAMPLE 1

(—Bis(β,β-dimethylphenethyl) 3,3-dimethylglutarate

A mixture consisting of 65 g. of β,β-dimethylphenethyl alcohol and 28.4 g. of 3,3-dimethylglutaric anhydride was warmed to 155° C. to solution, and to the warm solution there were added 100 ml. of toluene and 1 g. of p-toluene sulfonic acid. The mixture was then heated to reflux and toluene was removed until the pot temperature rose to 180° C. After further heating for 4 hours at 165° C., the reaction mixture was cooled, diluted with about 1 liter of ether, and then washed first with dilute, aqueous sodium carbonate solution and subsequently with water until neutral. After drying the washed material over sodium sulfate, it was distilled to give a fraction, B.P. 179° C. to 181° C./0.05 mm. This was purified by heating it at 270°–280° C. for about 21 hours in the presence of several strips of iron, then removing the strips and distilling to give the substantially pure bis(β,β-dimethylphenethyl) 3,3-dimethylglutarate B.P. 191°–192° C./0.05 mm., $n_D^{25}$ 1.5178, and analyzing 76.43 percent carbon and 8.77 percent hydrogen, as against 76.38 percent and 8.55 percent, the respective calculated values for $C_{27}H_{36}O_4$.

The pour point of the compound, determined by American Society for Testing Materials Procedure D97-57, was found to be −30° F.

EXAMPLE 2

(—Bis(β,β-dimethylphenethyl) azelate

To a mixture consisting of 30 g. (0.2 mole) of β,β-dimethylphenethyl alcohol and 180 ml. of pyridine there was added, dropwise, 21.3 g. (0.095 mole) of azelacyl chloride over a period of 1 hour, during which time the temperature of the reaction mixture increased exothermally to 35° C., and precipitation occurred. The whole was then stirred at about 45° C. for 22 hours. About 1 liter of ether was then added and the resulting mixture was washed first with very dilute, aqueous hydrochloric acid and subsequently with water until neutral. After drying over magnesium sulfate, distillation gave a fraction, B.P. 211° C./0.12 mm. to 209° C./0.10 mm., which after filtering through carbon black and alumina, gave 25.1 g. of the substantially pure bis(β,β-dimethylphenethyl) azelate, $n_D^{25}$ 1.5137, and analyzing 77.21 percent carbon and 9.21 percent hydrogen as against 76.95 percent and 8.91 percent, the respective calculated values for $C_{29}H_{40}O_4$.

EXAMPLE 3

(—Bis(β,β-dimethylphenethyl) azelate

This example is substantially like example 2, except that a much shorter reaction time was employed.

To a mixture consisting of 33 g. (0.22 mole) of β,β-dimethylphenethyl alcohol and 200 ml. of pyridine there was added, dropwise with stirring, 22.5 g. (0.1 mole) of azelaoyl chloride. The temperature rose to 40° C.; and after all of the chloride had been added, stirring was continued for about 5 hours at 45° C. The reaction mixture was then poured into about 400 ml. of water, and about 1.5 liter of ethyl ether was added to the resulting mixture. The resulting organic layer was washed first with water, then with dilute aqueous hydrochloric acid and finally with water, to neutral. After drying the washed product over sodium sulfate and magnesium sulfate, it was distilled to give a fraction, B.P. 205° C./0.13 mm. After filtering through attapulgus clay it was redistilled to give the substantially pure bis(β,β-dimethylphenethyl) azelate, B.P. 203° C./0.05 mm., $n_D^{25}$ 1.5137.

EXAMPLE 4

Evaluation of the functional fluid efficacy of the bis(β,β-dimethylphenethyl) 3,3-dimethylglutarate and azelate of examples 1–3 was conducted by determining the kinematic viscosities, ASTM slopes, vapor pressures and decomposition temperatures of the compounds. The following procedures were used to obtain the data shown below:

Kinematic viscosity was determined by American Society for Testing Materials D 445-T 1960 procedure, using ASTM kinematic viscosity thermometers which had been calibrated against National Bureau of Standards resistance thermometers.

The ASTM slope for the temperature range of 100° F. to 210° F. was obtained from plotting the viscosity—temperature relationships of the kinematic viscosity tests on ASTM viscosity—temperature charts D 341-39.

The vapor pressure measurements were made on the isoteniscope, employing substantially the procedure described by Edward S. Blake et al., J. Chem. Eng. Data, 6, 87 (1961).

The decomposition temperature, $T_D$, ° F., determined on the isoteniscope, is here defined as the temperature at which dp/dt (rate of pressure rise) due to decomposition of the test sample is 0.014 mm. 11 g./sec.

The following kinematic viscosities were obtained:

|  | Viscosity in Centistokes | | ASTM slope |
|---|---|---|---|
|  | at 100° F. | at 210° F. |  |
| Example 1 | 89.16 | 7.454 | 0.85 |
| Example 3 | 51.52 | 6.966 | 0.73 |

The following vapor pressure and thermal data were obtained:

| | Vapor Pressure | | | | |
|---|---|---|---|---|---|
| | ° C. at mm. Hg pressure | | | | |
| | 10 mm. | 100 mm. | 600 mm. | 760 mm. | $T_D$, ° F. |
| Example 1 | 264 | 329 | 392 | 401 | 570 |
| Example 2 | 280 | 340 | 396 | 404 | 592 |

EXAMPLE 5

(—2,2-Dimethyl-1,3-propanediol bis(2-methyl-2-phenylpropionate)

To a mixture consisting of 40.6 g. (0.390 mole) of 2,2-dimethyl-1,3-propanediol, 63.3 g. (0.80 mole) of pyridine and 300 ml. of benzene was added dropwise 143.2 g. (0.784 mole) of 2-methyl-2-phenylpropionyl chloride. The reaction mixture was then heated at reflux for 3 hours. It was cooled and shaken successively with water, dilute hydrochloric acid, and water, and dried over anhydrous magnesium sulfate. Distillation gave 125.7 g. (87 percent yield) of substantially pure 2,2-dimethyl-1,3-propanediol bis(2-methyl-2-phenylpropionate) boiling at 164° C./0.13 mm., $n_D^{25}$ 1.5140.

EXAMPLE 6

(—2,2-Dimethyl-1,3-propanediol bis(3-methyl-3-phenylbutyrate)

To a mixture consisting of 10.2 g. (0.098 mole) of 2,2-dimethyl-1,3-propanediol and 120 ml. of pyridine was added dropwise 38.5 g. (0.196 mole) of 3-methyl-3-phenylbutyryl chloride. The reaction mixture was then stirred at 45° C. for 3 hours, finally at 80° C. for 1 hour. It was cooled and poured into ice water. The oily mixture was shaken with about 1 liter of ethyl ether; then the ether layer was shaken successively with dilute hydrochloric acid and water, and dried over anhydrous sodium sulfate. Distillation gave 32.8 g. (79 percent yield) of substantially pure 2,2-dimethyl-1,3-propanediol bis(3-methyl-3-phenylbutyrate) boiling at 184° C./0.12 mm., $n_D^{25}$ 1.5178, and analyzing as follows:

| % | Found | Calcd. for $C_{27}H_{36}O_4$ |
|---|---|---|
| C | 76.07 | 76.38 |
| H | 8.38 | 8.55 |

EXAMPLE 7

(—2-Methyl-2-phenyl-1,3-propanediol bis(3-methyl-3-phenylbutyrate)

To a mixture consisting of 22.4 g. (0.135 mole) of 2-methyl-2-phenyl-1,3-propanediol (described in Chemical Abstracts 49, 12371a (1955)), 22.0 g. (0.277 mole) of pyridine and 600 ml. of benzene was added dropwise 54.6 g. (0.277 mole) of 3-methyl-3-phenylbutyryl chloride in 100 ml. of benzene. The reaction mixture was heated at reflux for 9 hours. It was cooled and shaken successively with water, dilute sodium bicarbonate solution, and water, and dried over anhydrous sodium sulfate. The low-boiling impurities were removed by distillation, leaving substantially pure 2-methyl-2-phenyl-1,3-propanediol bis-(3-methyl-3-phenylbutyrate) analyzing as follows:

| % | Found | Calcd. for C₂₈H₃₈O₄ |
|---|---|---|
| C | 78.73 | 78.98 |
| H | 7.82 | 7.87 |

EXAMPLE 8

(—1,1-Cyclohexanedimethanol bis(3-methyl-3-phenylbutyrate)

To a mixture consisting of 21.6 g. (0.15 mole) of 1,1-cyclohexanedimethanol, 25.0 g. (0.316 mole) pyridine and 500 ml. of benzene was added dropwise to 60.0 g. (0.305 mole) 3-methyl-3-phenylbutyryl chloride. The reaction mixture was heated at reflux for 9 hours. It was cooled and shaken successively with water, dilute hydrochloric acid, and water, and then dried over anhydrous sodium sulfate. The low-boiling impurities were removed by distillation at 0.6 mm. There was obtained 53.9 g. (77 percent yield) of substantially pure 1,1-cyclohexanedimethanol bis(3-methyl-3-phenylbutyrate) $n_D^{25}$ 1.5280, and analyzing as follows:

| % | Found | Calcd. for C₃₀H₄₀O₄ |
|---|---|---|
| C | 77.70 | 77.55 |
| H | 8.80 | 8.68 |

EXAMPLE 9

Evaluation of the oxidative stability of the 2,2-dimethyl-1,3-propanediol diesters of examples 5 and 6 was conducted by determining the percentage increase in the kinematic viscosity after controlled air oxidation at 450° F. A percentage increase of only 40 percent or less was considered good.

Kinematic viscosity was determined by American Society for Testing Materials D 445–61 procedure using Cannon-Manning semimicro-type viscometers, at a bath temperature of 210° F.

The oxidation was conducted by a Microoxidation Test Method whereby 20 ml. of the sample was bubbled with dry air at a rate of 20 liters/hour for 24 hours at 450° F. The sample was contained in a 22 mm., id Pyrex glass tube, and the air entry tube consisted of a 2.0 mm., id Pyrex glass tube.

Oxidative stability of two diesters having terminal phenylmethyl groups rather than the dimethyl(phenyl)methyl groups of instant invention are shown for comparison.

The following data were obtained:

|  | Increase in viscosity due to oxidation (percent) |
|---|---|
| Example 5 | 38 |
| Example 6 | 18 |
| ⌬—CH₂—C(O)—O—CH₂—C(CH₃)(CH₃)—CH₂—O—C(O)—CH₂—⌬ | 320 |
| ⌬—(CH₂)₂—C(O)—O—CH₂—C(CH₃)(CH₃)—CH₂—O—C(O)—(CH₂)₂—⌬ | 167 |

Although the presently provided dimethyl(phenyl)methyl substituted diesters are valuable functional fluids per se, for specialty uses they may be admixed with additives customarily employed as adjuvants in the lubricant and hydraulic fluid arts. Thus there may be added to the compositions small quantities of corrosion inhibitors, foam suppressors, flame retardants, extreme pressure-resisting agents, etc.

The dimethyl(phenyl)methyl substituted diesters may also be admixed in any quantity with other materials having functional fluid efficacy, since they are generally inert to esters, hydrocarbons, ethers, tertiary-amines and other constituents of conventional functional fluids. However, here again, if the fluids are to be employed under extreme conditions in an air environment, caution must be employed to avoid dilution of the present compounds to the extent that the diluted product no longer serves to withstand the conditions under which the presently provided dimethyl(phenyl)methyl substituted diesters are peculiarly useful.

Although the present invention has been described with preferred embodiments, it is to be understood that modifications and variations may be resorted to, without departing from the spirit and scope of the invention, as those skilled in the art will readily understand. Such variations and modifications are considered to be within the purview and scope of the appended claims.

What I claim is:

1. A diester of the formula

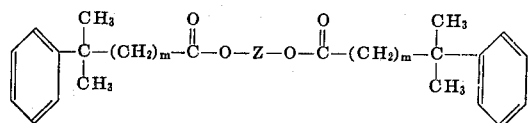

wherein $m$ is a number of from 0 to 2 and Z represents

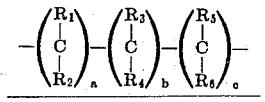

wherein $a$, $b$, and $c$ are numbers of from 0 to 3, $a+b+c$ is greater than 2, and where $R_1$, $R_2$, $R_3$, $R_4$, $R_5$ and $R_6$ taken separately are selected from a class consisting of hydrogen, lower alkyl and phenyl or, when taken together, $R_3$ and $R_4$ stand for a bivalent alkylene radical having from four to five carbon atoms in the chain and a total of from four to 10 carbon atoms.

2. A diester as defined in claim 11, wherein $m$ is equal to o, and Z represents

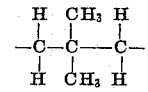

3. A diester as defined in claim 11, wherein $m$ is 1 and Z represents

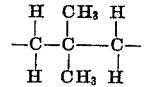

4. A diester as defined in claim 11, wherein $m$ is 1 and Z represents
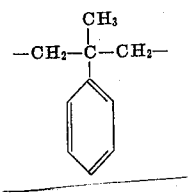
5. A diester as defined in claim 11, wherein $m$ is 1 and Z represents
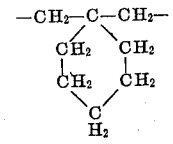
* * * * *

PO-1050
(5/69)

UNITED STATES PATENT OFFICE
CERTIFICATE OF CORRECTION

Patent No. 3,627,818            Dated December 14, 1971

Inventor(s) Edward S. Blake

It is certified that error appears in the above-identified patent and that said Letters Patent are hereby corrected as shown below:

Column 8, line 47 and 72; Column 9, line 1; and Column 10, line 1, change "11" to --- 1 ---.

Signed and sealed this 1st day of May 1973.

(SEAL)
Attest:

EDWARD M. FLETCHER, JR.           ROBERT GOTTSCHALK
Attesting Officer                    Commissioner of Patents